United States Patent [19]

Oh

[11] Patent Number: 5,728,799
[45] Date of Patent: Mar. 17, 1998

[54] AROMATIC POLYAMIDE, OPTICAL ANISOTROPIC DOPE AND ARTICLES AND PREPARATION FOR THE SAME

[75] Inventor: Tae-Jin Oh, Daeku, Rep. of Korea

[73] Assignee: Kolon Industries, Inc., Seoul, Rep. of Korea

[21] Appl. No.: 522,103

[22] Filed: Aug. 31, 1995

[30] Foreign Application Priority Data

Jul. 13, 1995 [KR] Rep. of Korea ............ 95-20615

[51] Int. Cl.$^6$ .................... C08G 69/08; C08G 73/10
[52] U.S. Cl. ............ 528/310; 528/322; 528/331; 528/335; 528/347; 528/348; 524/165; 524/205; 524/233; 524/600; 524/606
[58] Field of Search .................... 528/331, 322, 528/335, 310, 347, 348; 524/165, 205, 233, 600, 606

[56] References Cited

U.S. PATENT DOCUMENTS

| | | | |
|---|---|---|---|
| 3,671,541 | 6/1972 | Kwolek | 528/322 |
| 3,673,143 | 6/1972 | Bair et al. | 528/322 |
| 4,018,735 | 4/1977 | Nakagawa et al. | 528/322 |

*Primary Examiner*—P. Hampton-Hightower
*Attorney, Agent, or Firm*—Oblon, Spivak, McClelland, Maier & Neustadt, P.C.

[57] ABSTRACT

The present invention is directed to an aromatic polyamide of formula (I),

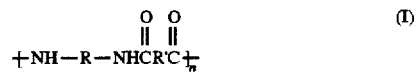

an optical anisotropic dope containing the aromatic polyamide and a process of making the optical anisotropic dope which does not require sulfuric acid. R is an unsubstituted aromatic group or an aromatic group having at least one nitrile group substituted on the aromatic nucleus, with the proviso that at least 25 mol % of R in the aromatic polyamide is an aromatic group having at least one nitrile group substituted on the aromatic nucleus; R' is phenyl, naphthyl or diphenyl, which is unsubstituted or substituted with Cl, Br, I, $NO_2$, an alkyl group having one to four carbon atoms or an alkoxy group having one to four carbon atoms; and n is an integer between 10 and 100,000.

36 Claims, 3 Drawing Sheets

AROMATIC POLYAMIDE, OPTICAL ANISOTROPIC DOPE AND ARTICLES AND PREPARATION FOR THE SAME

BACKGROUND OF THE INVENTION

(1) Field of the Invention

The present invention relates to an aromatic polyamide, in particular to a novel aromatic polyamide forming an optical anisotropic dope which is easily dissolved in a polar organic solvent and preparing thereof, an optical anisotropic aromatic polyamide dope and preparing thereof and a high modulus aromatic polyamide fibroid article prepared from the optical anisotropic aromatic polyamide dope.

(2) Description of the Related Art

In general, aromatic polyamide films and articles thereof are used valuably in composite materials of air craft and automobile industry, building materials and leisure and sports goods because they have a high strength, high modulus, heat resistance, abrasion resistance and insulating property.

Due to such utilities, there have been developed various processes for producing aromatic polyamide fibers and preparations for the articles. In case of an optical anisotropic aromatic polyamide dope, high strength and high modulus fiber can be prepared without drawing process because polymer chains are already arranged along the axis of the fiber during extrusion spinning from the nozzle, researches for preparing thereof have been actively performed.

For example, Du-pont Inc. discloses an industrial process wherein polybenzamide and polyparaphenylene terephthalamide are dissolved by heating with 100% sulfuric acid to prepare an optical anisotropic aromatic polyamide dope and high strength and high modulus aromatic polyamide fibers are prepared by extrusion spinning (U.S. Pat. Nos. 3,671,542 and 3,673,143).

U.S. Pat. No. 4,018,735 discloses a process wherein an aromatic polyamide prepared by incorporating 5 to 35 mole % of hetero ring unit of benzoxazol or imidazol is dissolved with sulfuric acid to produce an anisotropic aromatic dope.

Processes disclosed in the above papers include the use of 100% of sulfuric acid for heating and dissolving an aromatic polyamide to prepare an optical anisotropic dope of an aromatic polyamide, however the use of sulfuric acid leads to the decrease in the physical property by deteriorating the degree of polymerization during dissolving, environmental contamination and difficulty in process control.

SUMMARY OF THE INVENTION

The first object of the present invention is to provide a novel aromatic polyamide which can be used to produce an optical anisotropic aromatic polyamide dope under easy conditions.

The second object of the present invention is to provide an optical anisotropic aromatic polyamide dope which contains the above aromatic polyamide and does not contain sulfuric acid and a process for preparing the same.

The third object of the present invention is to provide a high strength and high modulus aromatic polyamide fiber of which component is mainly the above novel aromatic polyamide.

DETAILED DESCRIPTION OF THE INVENTION

Figure 1:
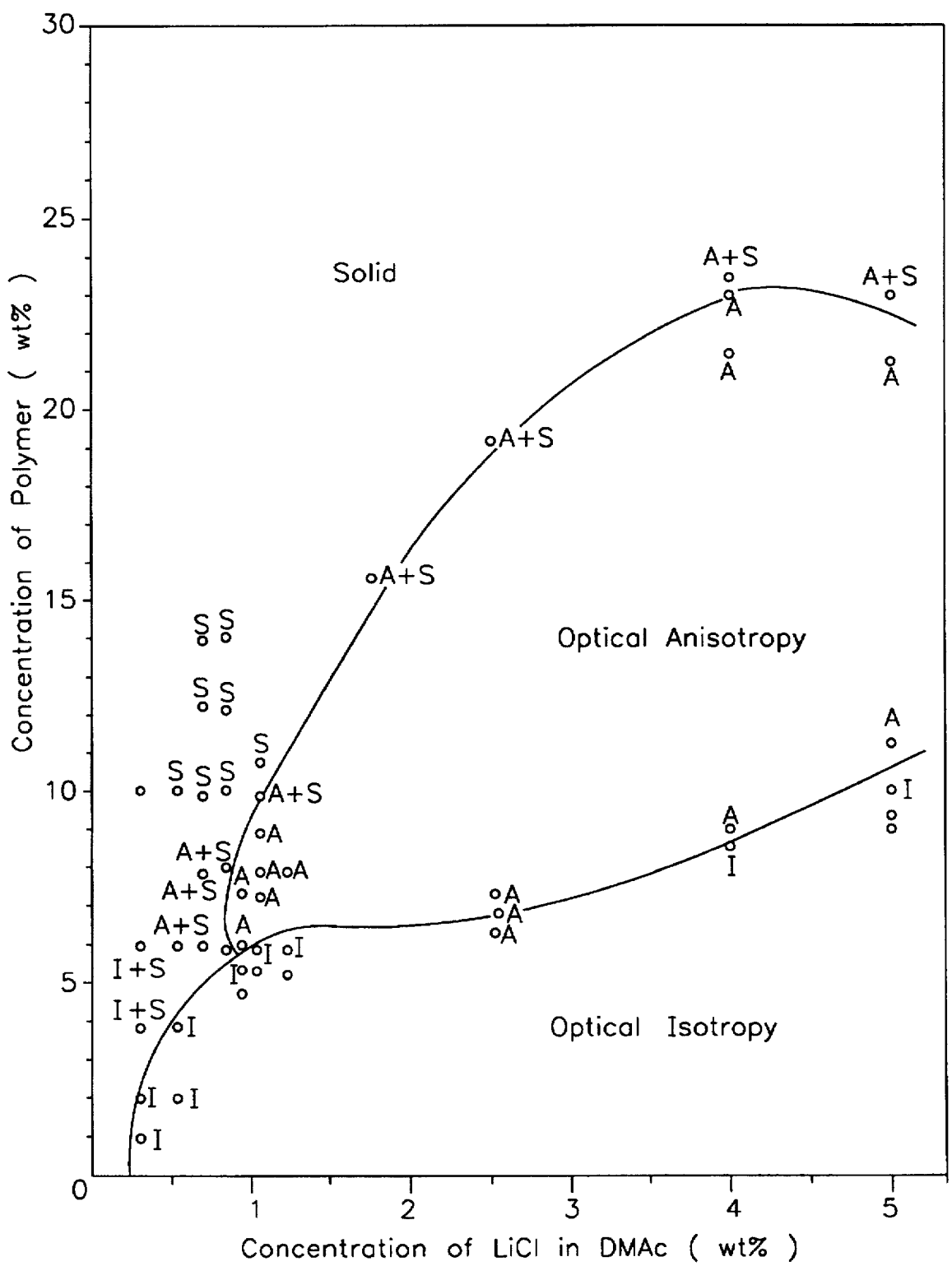
FIG. 1 is a phase transition diagram of a polymer according to the concentration of an inorganic salt and the polymer in a polar solvent.

In order to achieve the first object, the present invention provides an aromatic polyamide represented by the following structural formula (I)

wherein, R represents, for example,

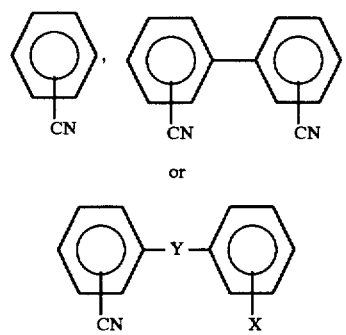

where X represents H, Cl, Br, I, $NO_2$ or an alkoxy group having 1 to 4 carbon atoms, n represents an integer between 10 and 100,000, and y represents

R' represents, for example,

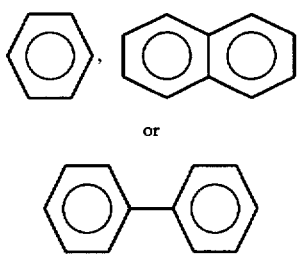

Particularly, the amount of the aromatic diamine, which forms a repeating unit of the above structural formula (I), having a nitrile group substituted on the aromatic nucleus is at least 25 mol %, preferably 25 to 100 mol % in the total aromatic diamine.

The aromatic polyamide of the above structural formula (I) is obtained by polycondensation with an aromatic diacid halide under the condition that the amount of the aromatic diamine having a nitrile group substituted on the aromatic nucleus is at least 25 mol %, preferably 25 to 100 mol % in the total aromatic diamine.

Both an aromatic diamine having a nitrile group substituted on the aromatic nucleus or that not having a nitrile group can be used for the aromatic diamine of the present invention, however, it is a characteristic of the present invention that the amount of the aromatic diamine having a nitrile group substituted on the aromatic nucleus is at least 25 mol %, preferably 25 to 100 mol % in the total aromatic diamine. Typical examples are as follows, however, the present invention is not limitatively defined by the followings as shown in the general structural formula (I).

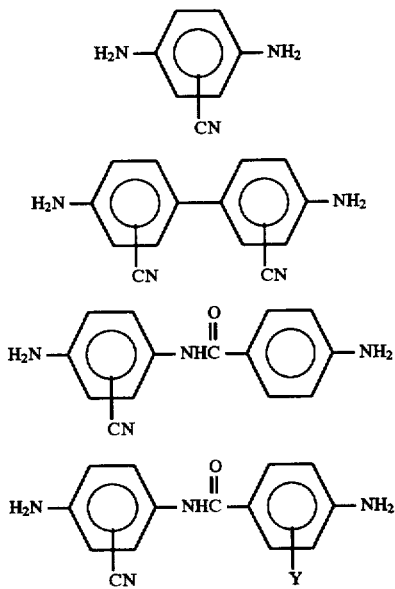

(wherein, Y represents Cl, Br, I, $NO_2$ or an alkyl or alkoxy group having 1 to 4 carbon atoms.)

Typical examples of an aromatic diacid halide which can be used in the present invention include terephthalic chloride, isophthalic chloride, naphthalic chloride and diphenyl chloride which may be unsubstituted or substituted with Cl, Br, I, $NO_2$ or an alkyl or alkoxy group having 1 to 4 carbon atoms.

The aromatic polyamide represented by the above formula (I) is a novel high molecular weight aromatic polyamide having a intrinsic viscosity of 2.0 or higher, preferably 2 to 10, which is soluble in a polar organic solvent, and the amount of diamine component having a nitrile group substituted on the aromatic nucleus is at least 25 mol %, preferably 25 to 100 mol % in the total diamine component.

The intrinsic viscosity can be calculated from the following formula by the measurement using an Ubbelohde viscometer and extrapolation of 5 selected dilute concentrations (in 98% sulfuric acid at 30° C.):

$$[\eta] = \lim_{c \to o} \frac{\eta_{SP}}{C}$$

$$\eta_{SP} = \eta_r - 1$$

$$\eta_r = \frac{t}{t_0}$$

where t is the time period taken for the solution to pass the viscometer, $t_0$ is the time period taken for the solvent to pass the viscosmeter, and C is the concentration of the solution.

The aromatic polyamide of the present invention can be confirmed by the absorption band of a nitrile group in the infrared spectrum at 2230 $cm^{-1}$.

The process for producing an aromatic polyamide of the structural formula (I) to achieve the second object of the present invention by forming an optical anisotropic aromatic polyamide polymerization dope of which the polymerization solution shows silver-white brightness during polymerization comprises the following steps of:

preparing a solvent for polymerization from an amide type organic solvent, an urea type organic solvent or a mixture thereof;

adding and dissolving an aromatic diamine having a nitrile group substituted on the aromatic nucleus in the solvent for polymerization;

adding pyridine as a polycondensation catalyst in the resulting solution;

adding the aromatic diacid halide in the solution with vigorous stirring at 0° to 50° C.; and continuing stirring for 1 to 360 minutes at the temperature to obtain a high viscous polymer solution which shows silver-white brightness during stirring.

In addition, the process for producing an aromatic polyamide of the structural formula (I) to achieve the second object of the present invention by forming an optical anisotropic aromatic polyamide polymerization dope of which the polymerization solution shows silver-white brightness during polymerization comprises the following steps of:

preparing a solvent for polymerization from an amide type organic solvent, an urea type organic solvent or a mixture thereof;

adding and dissolving an aromatic diamine having a nitrile group substituted on the aromatic nucleus in the solvent for polymerization;

adding the aromatic diacid halide in the solution with vigorous stirring at 0° to 50° C.;

keeping the gel type polymer obtained in the above step for 0 to 24 hours;

adding and dissolving an inorganic alkali compound selected from the group consisting of an alkali metal such as $Li_2CO_3$, $CACO_3$, LiH, $CaH_2$, LiOH, $Ca(OH)_2$, $Li_2O$ or CaO, carbonate of alkali earth metal, hydride, hydroxide or oxide with stirring for 1 hour to a few day; and obtaining a highly viscous polymer solution which shows silver-white brightness during stirring.

The above high viscosity polymer solution is an optical anisotropic polyamide dope showing various colors through the polarized microscope, and it is easily treated to articles such as polyamide fibers having high strength and high modulus, films and pulps by spinning through a nozzle into a coagulating bath. Additionally, not containing sulfuric acid in the optical anisotropic polyamide dopes of the present invention leads to no deteriorating of degree of polymerization of polyamide and easiness in process control.

As an organic solvent of the present invention, all organic solvents of amide or urea type can be used but it is preferable to use N-methyl-2-pyrrolidone (NMP), N,N-dimethyl acetamide (DMAc), hexamethyl phosphoamide (HMPA), N,N,N',N'-tetramethyl urea (TMU), N,N-dimethyl formamide (DMF), dimethyl sulfoxide (DMSO) or a mixture thereof.

An inorganic salt may be further added to a solvent for polymerization used in the present invention in order to increase the solubility. Typical examples of the inorganic salt include an alkali metal halide or an alkali earth metal halide such as $CaCl_2$, LiCl, NaCl, KCl, LiBr and KBr.

An inorganic salt can be added in the solvent for polymerization by itself or as a mixture of 2 or more. The added amount of the inorganic salt is desirably 12% by weight or lower based upon the weight of solvent for polymerization. The amount higher than 12% by weight is economically disadvantageous because the desired effects of the present invention cannot be expected.

A by-product (HCl) is produced by the reaction between an aromatic diamine and an aromatic diacid chloride in the third step of the latter process for producing an aromatic polyamide of the structural formula (I). To remove it from the polymerization process, an inorganic alkali compound selected from the group consisting of an alkali metal such as $Li_2CO_3$, $CaCO_3$, LiH, $CaH_2$, LiOH, $Ca(OH)_2$, $Li_2O$ or CaO, carbonate of alkali earth metal, hydride, hydroxide or oxide is added. An inorganic alkali compound or a mixture comprising 2 or more of it can be added and its added amount is desirably 10 to 200 mol % of the required equivalent to neutralize the HCl.

In addition, the second object of obtaining silver white optical anisotropic dope of the present invention can be also achieved by dissolving an aromatic polyamide of the structural formula (I) of which amount is 7% by weight or more in a polar organic solvent having 1% by weight or more of an inorganic salt at 0° to 100° C., preferably 20° to 70° C.

As a polar organic solvent, all organic solvents of amide or urea type can be used but it is preferable to use N-methyl-2-pyrrolidone (NMP), N,N-dimethyl acetamide (DMAc), hexamethyl phosphoamide (HMPA), N,N,N',N'-tetramethyl urea (TMU), N,N-dimethyl formamide (DMF), dimethyl sulfoxide (DMSO) or a mixture thereof.

Typical examples of the inorganic salt of the present invention include an alkali metal halide or an alkali earth metal halide such as $CaCl_2$, LiCl, NaCl, KCl, LiBr and KBr.

An inorganic salt can be added by itself or as a mixture of 2 or more. It is necessary that the added amount of the inorganic salt is at least 1% by weight, desirably 1 to 10% by weight. An amount lower than 1% by weight is not desirable to produce an optical anisotropic dope because the solubility of the polyamide of the structural formula (I) is decreased in the organic polar solution. An amount higher than 10% by weight is economically disadvantageous because the solubility of polyamide is not increased by increasing the amount of the inorganic salt.

The concentration of the polyamide in an organic polar solution for preparing an optical anisotropic dope can be changed according to the degree of polymerization of the polyamide, the viscosity of the dope or the concentration of the inorganic salt in the polar organic solvent, however, it is desirable to have at least 7% by weight, preferably 7 to 23% by weight of the polyamide. For a concentration of lower than 7% by weight, the optical property of the dope shows isotropy because of having a low amount of the polymer. For a concentration of higher than 23% by weight, the effects of the present invention cannot be expected because the dope is present in the state of a solid (FIG. 1).

Additionally, it is desirable that the degree of polymerization of the polyamide represented by the structural formula (I) is at least 2 or more of the limiting viscosity for preparing an optical anisotropic polyamide dope of the present invention.

Figure 2:
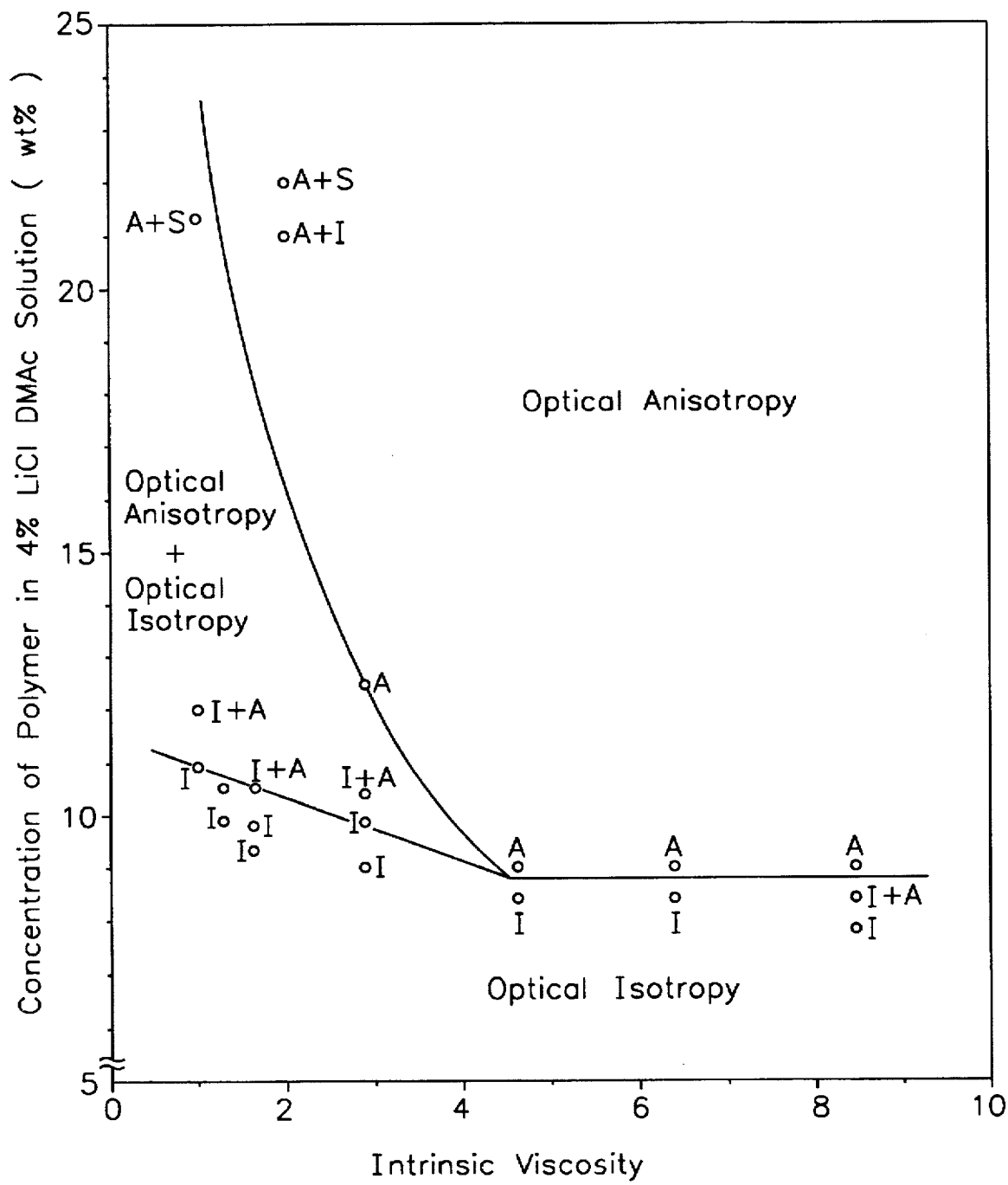
FIG. 2 is a phase transition diagram of a polymer according to the degree of polymerization of the polymer and the concentration of a polymer in a polar solvent.

With the degree of polymerization of the polyamide lower than 2 of intrinsic viscosity, an optical anisotropic dope of the present invention can not be obtained though the concentration of the polyamide is increased in an organic polar solvent (FIG. 2).

Further, the viscosity of the dope with the content of the polymer in it also has heavy effects on the optical property of the dope.

Figure 3:
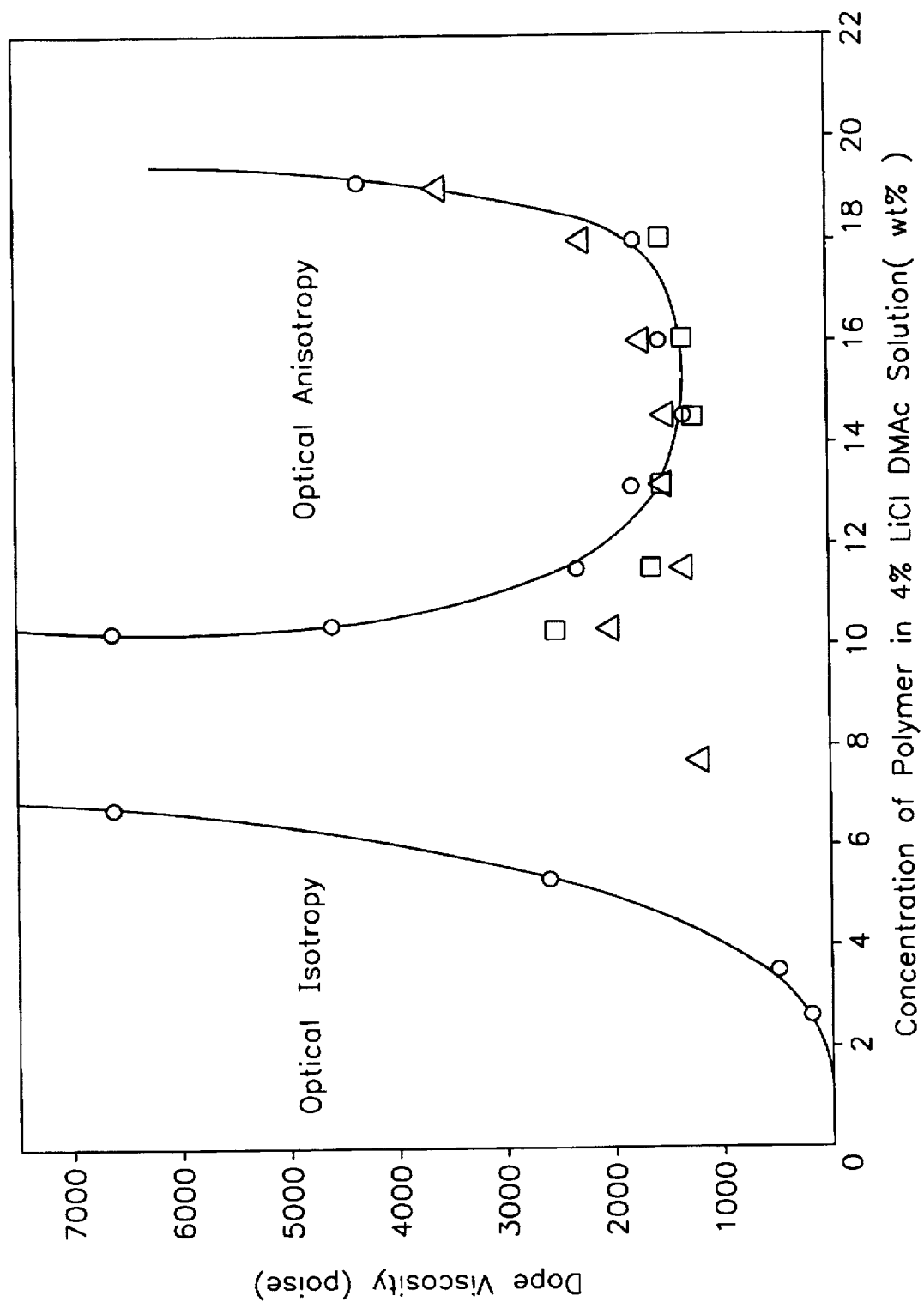
FIG. 3 is a phase transition diagram of a polymer according to the concentration of the polymer and the viscosity of the polymer dope.

With the viscosity of the dope higher than 1000 poise and the content of the polymer 10 to 20% by weight, an optical anisotropic dope can be obtained (FIG. 3).

FIG. 1 is an isotropic and anisotropic phase transition diagram according to the concentration of the polymer and DMAc-LiCl when the aromatic polyamide of structural formula (I) of the present invention is dissolved in the DMAc-LiCl solution.

As shown in FIG. 1, when the content of the inorganic salt (LiCl) is lower than 1% by weight in the polar organic solvent (DMAc), the optical isotropy is shown in the dope because the solubility of the polyamide is decreased or the dope is present in the state of a solid. When the concentration of the polymer is 7 to 23% by weight in the polar organic solvent, the optical anisotropy is shown in the dope.

FIG. 2 is an isotropic and anisotropic phase transition diagram according to the intrinsic viscosity of the degree of polymerization of the aromatic polyamide represented by the structural formula (I) of the present invention and the concentration of LiCl is 4% by weight of the DMAc.

As shown in FIG. 2, even with the concentration of the polymer higher than 7% by weight, the concentration at which the dope shows the optical anisotropic, if the degree of polymerization is lower than 2 of intrinsic viscosity, the optical anisotropy is not shown in the dope.

FIG. 3 is a diagram in which the concentration (the concentration of LiCl is 4% by weight of the DMAc) of the aromatic polyamide represented by the structural formula (I) and the viscosity of the dope are shown.

As shown in FIG. 3, the optical anisotropy is shown at certain concentration (from 10 to 20% by weight), wherein the viscosity of the dope is lower than that of the dope showing isotropy.

In order to achieve the third object, the present invention provides the aromatic polyamide fiber, pulp or articles of film which forms repeating unit represented by the following structural formula

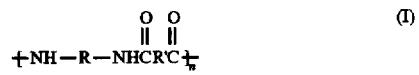

wherein, R represents an aromatic diamine such as

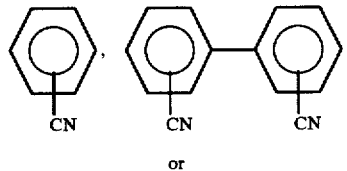

or

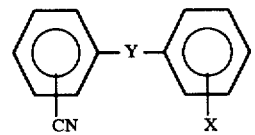

wherein an amount of the aromatic diamine having a nitrile group substituted on the aromatic nucleus is at least 25 mol % of the total aromatic diamine;

and X represents H, Cl, Br, I, $NO_2$ or an alkoxy group having 1 to 4 carbon atoms, n represents an integer between 10 and 100,000, y represents

and R' represents

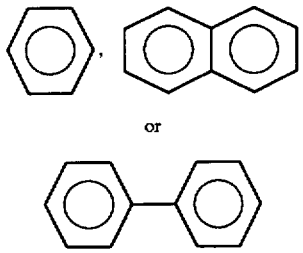

The aromatic polyamide fiber which forms the repeating unit represented by the structural formula (I) has a high strength and high modulus property (the tensile strength is 10 g/d or more and the tensile modulus is 450 g/d).

The aromatic polyamide fiber, pulp or article of film of the present invention is produced by spinning, coagulating, washing and drying as follows:

- an optical anisotropic polyamide dope having an aromatic polyamide of the above structural formula (I) which is obtained by polycondensation with an aromatic diacid halide monomer under the condition that an amount of the aromatic diamine having a nitrile group substituted on the aromatic nucleus is at least 25 mol %, preferably 25 to 100 mol % in the total aromatic diamine in the solvent for polymerization adding the inorganic salt such as an alkali metal halide or an alkali earth metal halide to the polar organic solvent including an amide type organic solvent, an urea type organic solvent or a mixture thereof with pyridine catalyst at 0° to 50° C.;

- an optical anisotropic polyamide dope having an aromatic polyamide of the above structural formula (I) obtained by adding an inorganic salt such as an alkali metal halide or an alkali earth metal halide to the gel type polymer which is obtained by polycondensation with an aromatic diacid halide monomer under the condition that the amount of the aromatic diamine having a nitrile group substituted on the aromatic nucleus is at least 25 mol % in the total aromatic diamine with the polar organic solvent including an amide type organic solvent, an urea type organic solvent or a mixture thereof at 0° to 50° C.; or

- an optical anisotropic polyamide dope which is obtained by dissolving the aromatic polyamide represented by the structural formula (I) in the polar organic solvent including the inorganic salt such as an alkali metal halide or an alkali earth metal halide according to the general production process of polyamide fibers, pulps or films.

The preferred examples will be described hereinafter to illustrate the present invention, but not limiting to it.

EXAMPLE 1

Preparation of an aromatic diamine monomer (4,4'-diamino-6-cyanobenzanilide) having a nitrile group substituted on the aromatic nucleus a) Preparation of 4,4'-dinitro-6-cyanobenzanilide

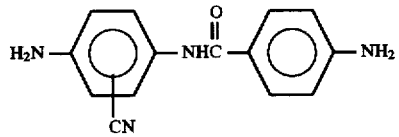

100 g (0.613 mol) of 5-nitro-anthranitrile was added to be dissolved in 640 ml of dimethylacetamide (DMAc) which was stirred under nitrogen stream. Then, 49.6 ml (0.613 mol) of pyridine was added to the solution and it was cooled to 5° to 10° C. in an ice bath. After cooling, 116.0 g (0.613 mol) of 4-nitrobenzoyl chloride in a powder form was added to the solution with vigorous stirring. The color of the solution was bright, violet and transparent in the initial stage. Then, it was changed to orange and translucent after an hour, and finally, to yellow and transparent after 4 days with stirring at ambient temperature. Yellow and transparent solution was obtained by filtering the above solution (if crystals are produced, additional DMAc is added to dissolve them). Reddish brown high viscous solution was obtained by distilling the above solution. Then, the solution was added to distilled water to solidify with stirring and filtered, washed with water and then washed with boiling ethanol and acetone twice, respectively. The solution was filtered and then dried in a vacuum oven at 60° C. to obtain 145 g of the raw material (yield was 76%).

b) Preparation of 4,4'-diamino-6-cyanobenzanilide (DACYB)

(METHOD 1)

900 ml of ethanol was charged into a 2 liter 4-bulb round flask under nitrogen stream, and 100 ml of cyclohexene, 5 g of palladium/carbon (5 wt. %) and 20 g (0.064 mol) of 4,4'-dinitro-6-cyanobenzanilide were added with stirring. Then, the solution was refluxed using an oil bath at 85° to 90° C. The dispersed solution showed yellow-earthy color in the initial stage and lost the yellow color as the time went by and then showed completely black color after 3 to 4 hours later with producing colorless crystals. 20 g of 4,4'-diamino-6-cyanobenzanilide was additionally added respectively 3 times, but even after 6 hours later, the yellow color was not disappeared after the second addition. In the third addition, the yellow color was disappeared by additional adding of 50 ml of cyclohexene and 1 g of palladium/carbon (5% by weight) with stirring over night. After the reaction, the solution was filtered and treated with an activated carbon to recrystallize and then recrystallized again in a mixture solvent (acetone:ethanol=1:1) by soxlet. After the reaction, the filtered solid was washed with acetone twice. The solution was filtered, treated with an activated carbon to recrystallize and dissolved in the mixture solvent (acetone:ethanol=1:1) to separate with the palladium/carbon (5% by weight). The solid was recrystallized by soxlet and the liquid was treated with the activated carbon, filtered, an separated by repeated recrystallization by soxlet. The separated solid was dried in a vacuum oven to obtain 60.5 g of the raw material (yield was 83.7%). The melting point of the obtained raw material was 250° to 251° C.

(METHOD 2)

350 ml of oleum (30% by weight) was cooled down below 0° C. using an ice bath. 99.6 g (0.368 mol) of 4,4'-diamino- 6-carbamoyl benzanilide in a powder form was added below 5° C. with stirring. The stirring was continued to the next day, and the solution was neutralized by adding 1100 ml of NH$_4$OH (28% by weight) already cooled down to −5° to 0° C. The solution was sufficiently washed to remove salt by filtering and washed with a small amount of warm ethanol and then dried in a vacuum oven at 80° C. The dried reactant which was mixed with by-products was extracted by soxlet and treated with the activated carbon and then ethanol was added to recrystallize in the mixture solvent (acetone:ethanol=1:1). The light yellow-scalelike crystal was filtered and dried in a vacuum oven at 80° C. The light yellow-scalelike crystal was extracted again by soxlet with acetone and treated with the activated carbon. And then the white-scalelike crystal obtained by recrystalling in the mixture solvent (acetone:ethanol=1:1) was dried in a vacuum oven at 80° C. (40 g of the raw material was obtained and the boiling point thereof was 250° to 251° C.).

EXAMPLE 2

Preparation of an optical anisotropic aromatic polyamide dope 65 ml of dimethylacetamide (DMAc) was charged into a 250 ml reactor under nitrogen stream, and 1.6 g of LiCl was added and completely dissolved to prepare a solvent for polymerization. 4 g of 4,4'-diamino-6-cyanobenzanilide (DACYB) was added and dissolved completely in the solution. 12.6 ml of pyridine was added and then 3.22 g of terephthaloyl chloride (TPC) was added at once at 10° to 15° C. with vigorous stirring. The viscosity of the polymerization solution was increased immediately and the solution become a viscous silver white optical anisotropic dope after a few minutes. The anisotropic dope was examined by a polarized microscope. The intrinsic viscosity of the obtained aromatic polyamide was 5.0 (examined in the 30° C., 97% by weight of sulfuric acid).

EXAMPLES 3 TO 9

Preparation of an optical anisotropic aromatic polyamide dope

Optical anisotropic dopes were prepared by the same method as EXAMPLE 2 except the amounts of the monomer and the additive, they are listed in the following Table 1.

EXAMPLE 10

Preparation of an aromatic polyamide filament

The optical anisotropic aromatic polyamide dope prepared in EXAMPLE 4 was extrusion-spinned into 0.5 to 2 cm of an air layer through nozzle and, at the same time, coagulated in the 20% by weight of dimethyl acetamide aqueous solution at 5° C. and then wound into a roller at a maximum speed. After being sufficiently washed with distilled water, the filament was dried in a drier at 150° C. The dried filament had a fineness of 2 denier, a tensile strength of 16 g/d, an elongation of 4.6% and a tensile modulus of 440 g/d.

EXAMPLES 11 TO 13

Preparation of an aromatic polyamide filament

The mechanical properties of the aromatic polyamide filaments prepared by the same method as EXAMPLE 10 are listed in the following Table 2.

TABLE 2

|  | Used Dope | Fineness (denier) | Tensile Strength (g/d) | Elongation (%) | Tensile Modulus (g/d) |
| --- | --- | --- | --- | --- | --- |
| EXAMPLE 11 | EX.6 | 0.6 | 20 | 4.8 | 510 |
| EXAMPLE 12 | EX.7 | 2.0 | 18 | 6.0 | 400 |
| EXAMPLE 13 | EX.8 | 1.3 | 19 | 5.5 | 370 |

EXAMPLE 14

Preparation of an optical anisotropic aromatic polyamide dope 50 ml of dimethylacetamide (DMAc) was charged into a 250 ml reactor under nitrogen stream, and 5.61 g (0.0258 mol) of 4,4'-diamino-6-cyanobenzanilide (DACYB) was added and dissolved in the solution. Then, the solution was cooled down below 20° C. with an ice bath and 5.32 g of terephthaloyl chloride (TPC) was added. The solution become rigid at the moment of adding terephthaloyl chloride. On the next day, the rigid polymer was dissolved slowly with adding 1.91 g (0.0258 mol) of Li$_2$CO$_3$ and become a clear silver white anisotropic polymer solution.

TABLE 1

|  | Components |  |  |  |  |  |  | Comp. & Prop. of dope dur. polyeriza. | | |
| --- | --- | --- | --- | --- | --- | --- | --- | --- | --- | --- |
|  | TPC (g) | DACYB (g) | LiCl(g) 100 ml | (g/ DMAc) | pyridine (ml) | DMAc (ml) | Conc. of mon. (wt %) | Conc. of pol. (wt %) | Opt. Prop. | Prop. of Pol. Int. Vis. |
| EX.3 | 5.63 | 7 | 1.6 | (2.56) | 7 | 65 | 15.4 | 12.9 | ANISO | 3.8 |
| EX.4 | 6.68 | 8.3 | 1.54 | (2.56) | 8.7 | 60 | 18.4 | 15.5 | ANISO | 4.7 |
| EX.5 | 9.30 | 11.6 | 2.03 | (2.56) | 7.4 | 79.2 | 20.0 | 16.8 | ANISO | 8.2 |
| EX.6 | 6.42 | 7.97 | 1.6 | (3.2) | 8.4 | 50 | 20.3 | 17.0 | ANISO | 5.9 |
| EX.7 | 6.43 | 7.98 | 1.7 | (3.4) | 8.4 | 50 | 20.3 | 17.0 | ANISO | 5.9 |
| EX.8 | 6.44 | 8 | 1.75 | (3.5) | 8.4 | 50 | 20.3 | 17.0 | ANISO | 4.0 |
| EX.9 | 6.48 | 8.05 | 1.9 | (3.8) | 8.5 | 50 | 20.3 | 17.0 | ANISO | 5.5 |

The polymer solution was slowly stirred for an additional day. The anisotropy of the dope was confirmed by a polarized microscope. The intrinsic viscosity of the obtained aromatic polyamide was 3.8 (examined in the 30° C., 97% by weight of sulfuric acid).

EXAMPLES 15 AND 16

Preparation of an optical anisotropic aromatic polyamide dope

Optical anisotropic dopes were prepared by the same method as EXAMPLE 14 except the amounts of the monomer and the additive. They are listed in the following Table 3.

(0.0204 mol) of 4,4'-diamino-2-cyanobenzanilide (DACYB) and 1.55 g (0.0068 mol) of 4,4'-diaminobenzanylamide (DAB) were added. After the solution was completely dissolved, 7.2 ml of pyridine was added with stirring. The solution was cooled down below 20° C. and then 5.52 g of terephthaloyl chloride (TPC) in a powder form was added. The solution become a viscous polymer solution with an optical anisotropy at the moment of adding terephthaloyl chloride. The polymer solution was slowly stirred for an additional day. The anisotropy of the dope was confirmed by a polarized microscope. The limiting viscosity of the obtained copolymerized aromatic polyamide was 6.6.

TABLE 3

| | | | Components | | | | Comp. & Prop. of dope dur. polyeriza. | | |
|---|---|---|---|---|---|---|---|---|---|
| | TPC (g) | DACYB (g) | LiCl(g) 100 ml | (g/ DMAc) | pyri- dine (ml) | DMAc (ml) | Conc. of mon. (wt %) | Conc. of pol. (wt %) | Opt. Prop. | Prop. of Pol. Int. Vis. |
| EX. 15 | 5.54 | 6.79 | 0 | | 1.99 | 50 | 20.0 | 17.2 | ANISO | 4.1 |
| EX. 16 | 5.32 | 6.51 | 0.08 | | 1.91 | 50 | 20.0 | 16.8 | ANISO | 5.2 |

EXAMPLE 17
Preparation of an aromatic polyamide filament

The optical anisotropic aromatic polyamide dope prepared in EXAMPLE 16 was extrusion-spinned into 0.5 to 2 cm of an air layer through nozzle and, at the same time, coagulated in the 20% by weight of dimethyl acetamide aqueous solution at 5° C. and then wound into a roller at a maximum speed. After being sufficiently washed with distilled water, the filament was dried in a drier at 150° C. The dried filament had a fineness of 1.0 denier, a tensile strength of 18.4 g/d, an elongation of 7.5% and a tensile modulus of 270 g/d.

EXAMPLE 18
Preparation of an optical anisotropic aromatic polyamide dope 50 ml of dimethylacetamide (DMAc) was charged into a reactor and dissolved under nitrogen stream, and 5.51 g

EXAMPLES 19 TO 22

Preparation of an optical anisotropic aromatic polyamide dope

Optical anisotropic dopes were prepared by the same method as EXAMPLE 18 except the amounts of the monomer and the additive. They are listed in the following Table 4.

TABLE 4

| | | Components | | | | | | | Comp. & Prop. of dope fur. polymeriza. | | |
|---|---|---|---|---|---|---|---|---|---|---|---|
| | | Comp. of Arom. diamine | | | LiCl (g) | | | Conc. | Conc. of | | Prop of |
| | TPC (g) | DACYB (Ag) | DAB (Bg) | Mol Rai. A:B | (g/100 ml DMAc) | Pyri dine (ml) | DMAc (ml) | of mon. (wt %) | pol. (wt. %) | Opt. Prop. | Pol. Int. Vis. |
| EX. 19 | 5.60 | 3.48 | 3.14 | 50:50 | 1.75 (3.5) | 7.3 | 50 | 18.0 | 15.0 | ANISO | 5.3 |
| EX. 20 | 8.26 | 6.16 | 3.70 | 60:40 | 2.28 (3.2) | 10.8 | 74.3 | 18.0 | 15.0 | ANISO | 3.8 |
| EX. 21 | 5.55 | 4.14 | 2.49 | 60:40 | 1.5 (3.0) | 7.3 | 50 | 18.0 | 15.0 | ANISO | 5.0 |
| EX. 22 | 6.09 | 5.68 | 1.70 | 75:25 | 2 (4) | 7.9 | 50 | 19.2 | 16.1 | ANISO | 3.8 |

EXAMPLE 23

Preparation of an aromatic polyamide filament

The optical anisotropic aromatic polyamide dope composed of DACYB 75 mol %/DAB 25 mol % of an aromatic diamine monomer which was prepared in EXAMPLE 22 was extrusion-spinned into 0.5 to 2 cm of an air layer through nozzle and, at the same time, coagulated in the 20% by weight of dimethyl acetamide aqueous solution at 5° C. and then wound into a roller at a maximum speed. After being sufficiently washed with distilled water, the filament was dried in a drier at 150° C. The dried filament had a fineness of 1.2 denier, a tensile strength of 12 g/d, an elongation of 5% and a tensile modulus of 500 g/d.

EXAMPLE 24

Preparation of an aromatic polyamide filament

The optical anisotropic aromatic polyamide dope composed of DACYB 60 mol %/DAB 40 mol % of an aromatic diamine monomer which was prepared in EXAMPLE 21 was extrusion-spinned into 0.5 to 2 cm of an air layer through nozzle and, at the same time, coagulated in the 20% by weight of dimethyl acetamide aqueous solution at 5° C. and then wound into a roller at a maximum speed. After being sufficiently washed with distilled water, the filament was dried in a drier at 150° C. The dried filament had a fineness of 1.1 denier, a tensile strength of 21 g/d, an elongation of 5% and a tensile modulus of 500 g/d.

EXAMPLE 25

Preparation of an optical anisotropic aromatic polyamide dope 50 ml of dimethylacetamide (DMAc) was charged into a reactor and dissolved under nitrogen stream, and 1.75 g of LiCl was added and dissolved and then 5.97 g of 2-cyano-1,4-phenylenediamine (CYPPD) was added. After the solution was completely dissolved, 11.9 ml of pyridine was added. Then, the solution was cooled down below 20° C. using an ice bath and 9.10 g of terephthaloyl chloride (TPC) in a powder form was added with vigorous stirring. The solution become a viscous polymer solution with an optical anisotropy at the moment of adding terephthaloyl chloride. The polymer solution was slowly stirred for an additional day. The anisotropy of the dope was confirmed by a polarized microscope. The intrinsic viscosity of the obtained copolymerized aromatic polyamide was 3.9.

EXAMPLE 26

Preparation of an optical anisotropic aromatic polyamide dope 50 ml of dimethylacetamide (DMAc) was charged into a reactor and dissolved under nitrogen stream, and 2 g of LiCl was added and dissolved and then 4.32 g of 2-cyano-1,4-phenylenediamine (CYPPD) and 1.50 g of p-phenyl diamine were added. After the solution was completely dissolved, 12.3 ml of pyridine was added. Then, the solution was cooled down below 20° C. using an ice bath and 9.40 g of terephthaloyl chloride (TPC) in a powder form was added with vigorous stirring. The solution become a viscous polymer solution with an optical anisotropy at the moment of adding terephthaloyl chloride. The polymer solution was slowly stirred for an additional day. The anisotropy of the dope was confirmed by a polarized microscope. The intrinsic viscosity of the obtained copolymerized aromatic polyamide was 2.4.

EXAMPLE 27

Preparation of an optical anisotropic aromatic polyamide dope 50 ml of dimethylacetamide (DMAc) was charged into a reactor and dissolved under nitrogen stream, and 2 g of LiCl was added and dissolved and then 5.51 g of 4,4'-diamino 2-cyano benzanylineimide and 0.97 g of 1,4-phenylene diamine (CYPPD) were added. After the solution was completely dissolved, 12.3 ml of pyridine was added. Then, the solution was cooled down below 20° C. using an ice bath and 5.91 g of terephthaloyl chloride (TPC) in a powder form was added with vigorous stirring. The solution become a viscous polymer solution with an optical anisotropy at the moment of adding terephthaloyl chloride. The polymer solution was slowly stirred for an additional day. The anisotropy of the dope was confirmed by a polarized microscope. The limiting viscosity of the obtained copolymerized aromatic polyamide was 3.1.

What is claimed is:

1. An aromatic polyamide of formula (I)

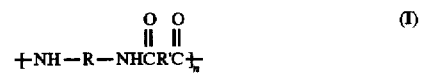

wherein

R is an aromatic group having a nitrile group substituted on the aromatic nucleus or an aromatic group that does not have a nitrile group substituted on the aromatic nucleus, where at least 25 mol % of R is an aromatic group having a nitrile group substituted on the aromatic nucleus;

R' is phenyl, napthyl or diphenyl, which is unsubstituted or substituted with Cl, Br, I, NO$_2$, an alkyl group having one to four carbon atoms or an alkoxy group having one to four carbon atoms; and n is an integer between 10 and 100,000.

2. The aromatic polyamide of claim 1, wherein an absorption band of said nitrile group is shown at 2230 cm$^{-1}$ in an infrared spectrum.

3. The aromatic polyamide of claim 1, wherein R is selected from the group consisting of:

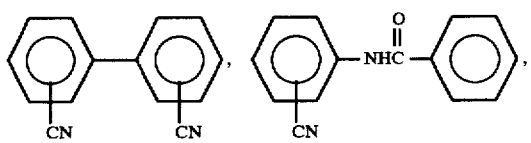

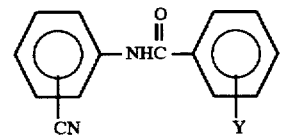

and

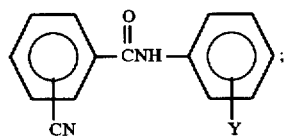

wherein Y is Cl, Br, I, NO$_2$, an alkyl group having one to four carbon atoms or an alkoxy group having one to four carbon atoms.

4. The aromatic polyamide of claim 1, wherein 100 mol % of R is an aromatic group having a nitrile group substituted on the aromatic nucleus.

5. The aromatic polyamide of claim 1, which is soluble in a polar organic solvent containing an inorganic salt.

6. The aromatic polyamide of claim 1, which has an intrinsic viscosity of at least 2.0.

7. An anisotropic polyamide dope, comprising:
(a) an aromatic polyamide of formula (I)

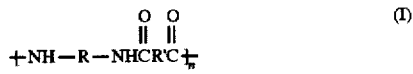

wherein

R is an aromatic group having a nitrile group substituted on the aromatic nucleus or an aromatic group that does not have a nitrile group substituted on the aromatic nucleus, where at least 25 mol % of R is an aromatic group a having a nitrile group substituted on the aromatic nucleus;

R' is phenyl, napthyl or diphenyl, which is unsubstituted or substituted with Cl, Br, I, $NO_2$, an alkyl group having one to four carbon atoms or an alkoxy group having one to four carbon atoms; and n is an integer between 10 and 100,000;
(b) a polar organic solvent; and
(c) an inorganic salt;

wherein the dope contains at least 7% by weight of said aromatic polyamide and at least 1% by weight of said inorganic salt.

8. The anisotropic polyamide dope of claim 7, wherein R is selected from the group consisting of

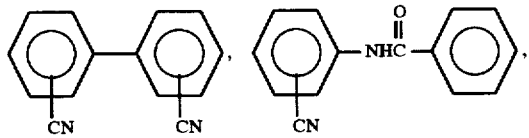

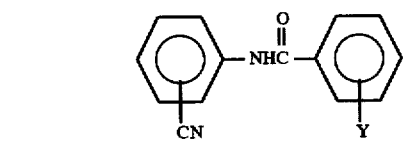

and

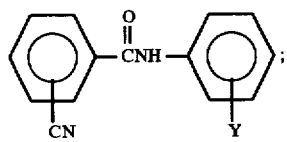

wherein Y is Cl, Br, I, $NO_2$, an alkyl group having one to four carbon atoms or an alkoxy group having one to four carbon atoms.

9. The anisotropic polyamide dope of claim 7, wherein 100 mol % of said R is an aromatic group having a nitrile group substituted on the aromatic nucleus.

10. The anisotropic polyamide dope of claim 7, wherein said aromatic polyamide has an intrinsic viscosity of at least 2.0.

11. The anisotropic polyamide dope of claim 7, wherein said inorganic salt is selected from the group consisting of $CaCl_2$, LiCl, NaCl, KCl, LiBr and KBr.

12. The anisotropic polyamide dope of claim 7, comprising 7 to 23% by weight of said aromatic polyamide.

13. The anisotropic polyamide dope of claim 7, comprising 1 to 10% by weight of said inorganic salt.

14. The anisotropic polyamide dope of claim 7, wherein said polar organic solvent is selected from the group consisting of N-methyl-2-pyrrolidone, N,N-dimethyl acetamide, hexamethyl phosphoamide, N,N,N',N'-tetramethyl urea, N,N-dimethyl formamide and dimethyl sulfoxide.

15. An article selected from the group consisting of a fiber, pulp and a film produced by a process comprising spinning and coagulating the anisotropic polyamide dope of claim 7.

16. The article of claim 15, having a tensile strength of at least 10 g/d.

17. The article of claim 15, having a tensile modulus of at least 450 g/d.

18. A process of making an optical anisotropic polyamide dope, comprising:
(a) adding and dissolving an aromatic diamine having a nitrile group substituted on the aromatic nucleus in an organic solvent, where said solvent is an amide or a urea;
(b) adding pyridine to the solution from step (a);
(c) adding an aromatic diacid halide to the solution from step (b) with vigorous stirring at a temperature of 0°–50° C.; and
(d) stirring the solution from step (c) for 1 to 360 minutes to obtain a viscous polymer solution which shows silver-white brightness when stirred.

19. The process of claim 18, wherein said aromatic diamine is selected from the group consisting of

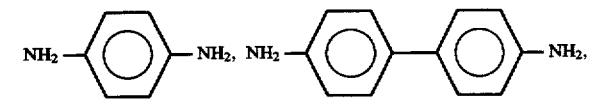

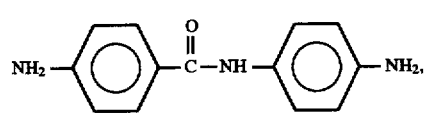

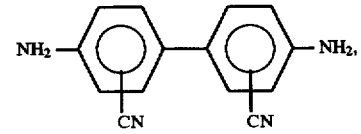

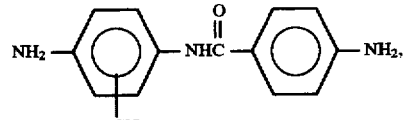

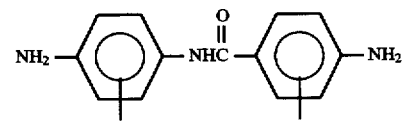

and

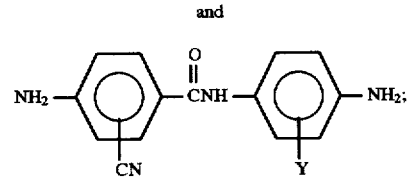

wherein Y is Cl, Br, I, $NO_2$, an alkyl group having one to four carbon atoms or an alkoxy group having one to four carbon atoms.

20. The process of claim 18, wherein said aromatic diacid halide is selected from the group consisting of terephthalic chloride, isophthalic chloride and diphenyl chloride, which may be unsubstituted or substituted with Cl, Br, I, NO$_2$, an alkyl group having one to four carbon atoms or an alkoxy group having one to four carbon atoms.

21. The process of claim 18, wherein said organic solvent is selected from the group consisting of N-methyl-2-pyrrolidone, N,N-dimethyl acetamide, hexamethyl phosphoamide, N,N,N'N'-tetramethyl urea, N,N-dimethyl formamide and dimethyl sulfoxide.

22. The process of claim 18, wherein said organic solvent contains an inorganic salt.

23. The process of claim 22, wherein said inorganic salt is selected from the group consisting of CaCl$_2$, LiCl, NaCl, KCl, LiBr and KBr.

24. The process of claim 22, wherein the amount of said inorganic salt is less than 12% by weight of said organic solvent.

25. A process of making an optical anisotropic polyamide dope, comprising:
(a) adding and dissolving an aromatic diamine having a nitrile group substituted on the aromatic nucleus in an organic solvent, wherein said solvent is an amide or a urea;
(b) adding an aromatic diacid halide to the solution from step (a) with vigorous stirring at a temperature of 0°–50° C. to produce a gel polymer;
(c) keeping the mixture from step (b) for 0–24 hours; and
(d) adding and dissolving at least one inorganic alkali compound.

26. The process of claim 25, wherein said aromatic diamine is selected from the group consisting of

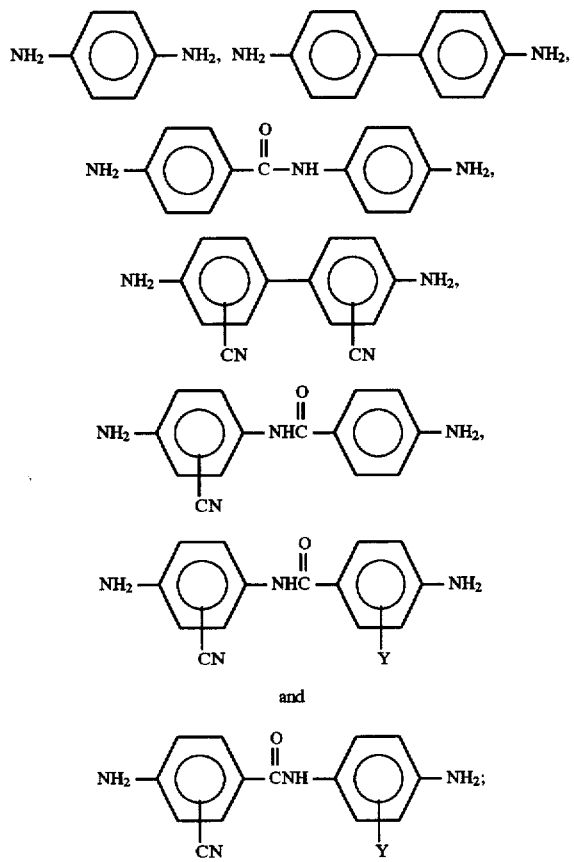

wherein Y is Cl, Br, I, NO$_2$, an alkyl group having one to four carbon atoms or an alkoxy group having one to four carbon atoms.

27. The process of claim 25, wherein said aromatic diacid halide is selected from the group consisting of terephthalic chloride, isophthalic chloride and diphenyl chloride, which may be unsubstituted or substituted with Cl, Br, I, NO$_2$, an alkyl group having one to four carbon atoms or an alkoxy group having one to four carbon atoms.

28. The process of claim 25, wherein said organic solvent is selected from the group consisting of N-methyl-2-pyrrolidone, N,N-dimethyl acetamide, hexamethyl phosphoamide, N,N,N'N'-tetramethyl urea, N,N-dimethyl formamide and dimethyl sulfoxide.

29. The process of claim 25, wherein said inorganic alkali compound is selected from the group consisting of Li$_2$CO$_3$, CACO$_3$, LiH, CaH$_2$, LiOH, Ca(OH)$_2$, Li$_2$O and CaO.

30. A process for preparing an optical anisotropic polymer dope, comprising:

adding an aromatic polyamide of formula (I)

to a polar organic solvent containing therein at 1% by weight or more of an inorganic salt at a temperature of 0°–100° C., wherein the dope contains at least 7% by weight of said aromatic polyamide;

R is an aromatic group having a nitrile group substituted on the aromatic nucleus or an aromatic group that does not have a nitrile group substituted on the aromatic nucleus, where at least 25 mol % of R is an aromatic group having a nitrile group substituted on the aromatic nucleus;

R' is phenyl, napthyl or diphenyl, which is unsubstituted or substituted with Cl, Br, I, NO$_2$, an alkyl group having one to four carbon atoms or an alkoxy group having one to four carbon atoms; and n is an integer between 10 and 100,000.

31. The process of claim 30, wherein R is selected from the group consisting of

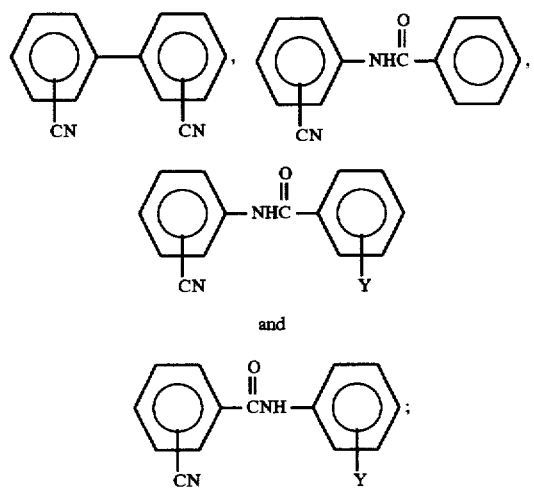

where Y is Cl, Br, I, NO$_2$, an alkyl group having one to four carbon atoms or an alkoxy group having one to four carbon atoms.

32. The process of claim 30, wherein 100 mol % of R is an aromatic group having a nitrile group substituted on the aromatic nucleus.

33. The process of claim 30, wherein said aromatic polyamide has an intrinsic viscosity of at least 2.0.

34. The process of claim 30, wherein the dope contains 7–23% by weight of said aromatic polyamide.

35. The process of claim 30, wherein the dope contains 1–10% by weight of said inorganic salt.

36. The process of claim 30, wherein said inorganic salt is selected from the group consisting of $CaCl_2$, LiCl, NaCl, KCl, LiBr and KBr.

* * * * *